(12) United States Patent
Rokusek et al.

(10) Patent No.: US 9,584,041 B2
(45) Date of Patent: Feb. 28, 2017

(54) METHOD AND APPARATUS FOR CHARGING DEVICES USING A MULTIPLE PORT POWER SUPPLY

(71) Applicant: Google Technology Holdings LLC, Mountain View, CA (US)

(72) Inventors: Daniel S. Rokusek, Long Grove, IL (US); Wayne G. Anderson, Dacula, GA (US); Daniel Nowak, Chicago, IL (US); Daniel H. Wagner, Grayslake, IL (US)

(73) Assignee: Google Technology Holdings LLC, Mountain View, CA (US)

(*) Notice: Subject to any disclaimer, the term of this patent is extended or adjusted under 35 U.S.C. 154(b) by 346 days.

(21) Appl. No.: 14/101,377

(22) Filed: Dec. 10, 2013

(65) Prior Publication Data

US 2015/0054451 A1 Feb. 26, 2015

Related U.S. Application Data

(60) Provisional application No. 61/869,865, filed on Aug. 26, 2013.

(51) Int. Cl.
*H02J 7/00* (2006.01)
*H02M 7/23* (2006.01)

(52) U.S. Cl.
CPC ............. *H02M 7/23* (2013.01); *H02J 7/0027* (2013.01); *H02J 2007/0062* (2013.01)

(58) Field of Classification Search
CPC .......... Y02E 60/12; H02J 7/025; H01F 38/14; Y02T 90/122; B60L 11/182

(Continued)

(56) References Cited

U.S. PATENT DOCUMENTS 4,984,079 A * 1/1991 Ho ............................ H03F 3/72
                                                        333/16
5,508,905 A * 4/1996 Reichard ................. H02M 7/49
                                                        307/58

(Continued)

OTHER PUBLICATIONS

Decision to Grant and English Translated Allowed Claims from corresponding application CN201420486384.8 dated Feb. 27, 2015, 7 pages.

(Continued)

*Primary Examiner* — Richard Isla Rodas
*Assistant Examiner* — Mohammed J Sharief
(74) *Attorney, Agent, or Firm* — Brake Hughes Bellermann LLP

(57) ABSTRACT

A method and apparatus charge devices using a multiple port power supply. The apparatus can include a power supply. The apparatus can include a first device charging port coupled to the power supply. The first device charging port can receive power from the power supply and output power to a first device. The apparatus can include a second device charging port coupled to the power supply. The second device charging port can receive power from the power supply and output power to a second device. The apparatus can include a device charging port monitor coupled to the first device charging port and coupled to the second device charging port. The device charging port monitor can detect a number of device charging ports in use. The apparatus can include a cable compensator coupled to the device charging port monitor. The cable compensator can select a first cable compensation if one device charging port is in use and can select a second cable compensation if two device charging ports are in use.

19 Claims, 2 Drawing Sheets

(58) Field of Classification Search
USPC ........................................................ 320/108
See application file for complete search history.

(56) References Cited

U.S. PATENT DOCUMENTS

| | | | | |
|---|---|---|---|---|
| 5,963,015 A | * | 10/1999 | Lee | H02J 7/0068 320/128 |
| 6,246,211 B1 | * | 6/2001 | Dalton | H02J 7/0044 320/103 |
| 8,368,252 B2 | | 2/2013 | Pabon | |
| 8,384,241 B2 | | 2/2013 | Chen et al. | |
| 2005/0186819 A1 | * | 8/2005 | Velleca | H01R 13/6691 439/188 |
| 2005/0280964 A1 | * | 12/2005 | Richmond | H02J 3/14 361/62 |
| 2010/0067197 A1 | * | 3/2010 | Guccione | G06F 1/26 361/728 |
| 2010/0090528 A1 | * | 4/2010 | Makwinski | G06F 1/26 307/31 |
| 2010/0148730 A1 | * | 6/2010 | Choi | H02J 7/08 320/145 |
| 2010/0181840 A1 | * | 7/2010 | Coulson | H02J 1/00 307/103 |
| 2011/0221604 A1 | * | 9/2011 | Johnson | G06F 1/266 340/664 |
| 2013/0103878 A1 | | 4/2013 | Ho et al. | |
| 2013/0130744 A1 | * | 5/2013 | Jeong | H04M 1/6058 455/557 |
| 2014/0099821 A1 | * | 4/2014 | Shammoh | H01R 25/006 439/535 |

OTHER PUBLICATIONS

Office Action for Chinese Patent Application No. 201420486384.8, mailed on Nov. 26, 2014, 4 pages.

* cited by examiner

METHOD AND APPARATUS FOR CHARGING DEVICES USING A MULTIPLE PORT POWER SUPPLY

BACKGROUND

1. Field

The present disclosure is directed to a method and apparatus for charging devices using a multiple port power supply. More particularly, the present disclosure is directed to providing cable compensation when charging devices using a multiple port power supply.

2. Introduction

Presently, power supplies are used to charge electronic devices. To charge a device, the device is connected to a power supply device charging port using a connection cable. The power supply then provides power through the connection cable to charge the device.

Unfortunately, the connection cable adversely affects device charging because it causes a voltage drop from the power supply to the device. The voltage drop causes a problem because both a power supply and device power management circuitry have minimum and maximum voltage charging requirements and these voltage requirements are adversely affected by the voltage drop. For example, Universal Serial Bus (USB) specifications require specific minimum and maximum power supply voltages. However, a USB connection cable that uses 60 inch 24 gauge wire causes an 180 mV per amp drop between the power supply and the device. If the voltage drop is not accounted for, the connection cable causes power supply voltage to fall outside of the voltage requirements. Other power supply specifications have other requirements, such as other minimum and maximum voltage charging requirements. Furthermore, other connection cables and other connection cable lengths and sizes cause different voltage drops.

The voltage drop problem gets worse if multiple devices are connected to a single power supply. This is because the voltage drop changes when multiple devices are connected and the power supply is unable to account for different voltage drops.

Thus, there is a need for a method and apparatus for charging devices using a multiple port power supply.

BRIEF DESCRIPTION OF THE DRAWINGS

In order to describe the manner in which advantages and features of the disclosure can be obtained, a more particular description of the disclosure briefly described above will be rendered by reference to specific embodiments thereof which are illustrated in the appended drawings. Understanding that these drawings depict only example embodiments of the disclosure and are therefore not to be considered to be limiting of its scope, the disclosure will be described and explained with additional specificity and detail through the use of the accompanying drawings in which.

DETAILED DESCRIPTION

Embodiments can provide a method and apparatus that charge devices using a multiple port power supply. The apparatus can include a power supply. The apparatus can include a first device charging port coupled to the power supply. The first device charging port can receive power from the power supply and output power to a first device. The apparatus can include a second device charging port coupled to the power supply. The second device charging port can receive power from the power supply and output power to a second device. The apparatus can include a device charging port monitor coupled to the first device charging port and coupled to the second device charging port. The device charging port monitor can detect a number of device charging ports in use. The apparatus can include a cable compensator coupled to the device charging port monitor. The cable compensator can select a first cable compensation if one device charging port is in use and can select a second cable compensation if two device charging ports are in use.

Figure 1:
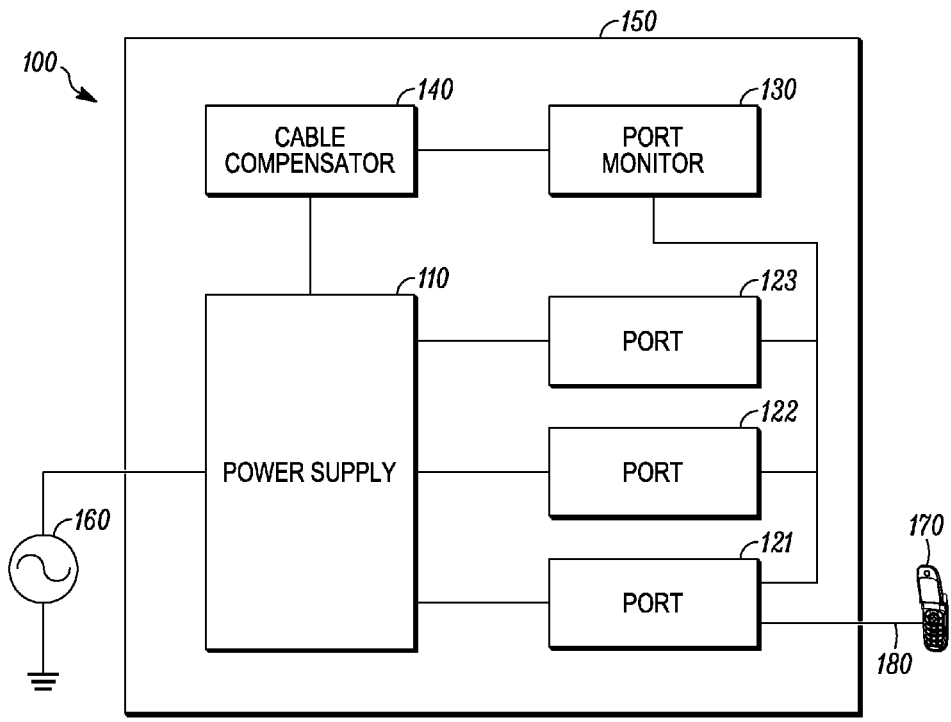
FIG. 1 illustrates an example block diagram of an apparatus in accordance with a possible embodiment.

FIG. 1 illustrates an example block diagram of an apparatus 100 in accordance with a possible embodiment. The apparatus 100 can include a power supply 110, device charging ports 121-123, a device charging port monitor 130, a cable compensator 140, and a housing 150. The device charging ports 121-123 can be Universal Serial Bus (USB) ports, IEEE 1394 ports, three-pin ports, eight prong connector ports, thirty pin connector ports, or any other ports or combination of ports that can charge an electronic device. The power supply 110 can be connected to a power source 160 or may use an internal or external battery, generator, solar power supply, or other power source for power. While the apparatus 100 is described as including a power supply 110, the entire apparatus 100 or selected elements of the apparatus 100 can also be considered a power supply.

The device charging ports 121-123 can receive power from the power supply 110 and output power to devices, such as the device 170, connected to the device charging ports 121-123 using connection cables, such as the cable 180. The device 170 can be a portable electronic device, such as a wireless communication device, a wireless telephone, a cellular telephone, a personal digital assistant, a smartphone, a pager, a personal computer, a selective call receiver, a tablet computer, a media player, a rechargeable battery, a device with a rechargeable battery, or any other device that requires a power supply for power. The cable 180 can be a dedicated charging cable, a USB cable, an IEEE 1394 cable, an eight prong connector cable, a thirty pin connector cable, or any other cable that can provide power to an electronic device. The terms "charging port" and "power output port" are herein defined as interchangeable and references to one can and do mean the other. Similarly, the terms "charging cable" and "power cable" are herein defined as interchangeable and references to one can and do mean the other.

The device charging port monitor 130 can detect a number of device charging ports in use. The number of charging ports in use can be an approximated or assumed number of charging ports in use. The cable compensator 140 can select cable compensation based on the detected number of charging ports in use. For example, the cable compensator 140 can select a first cable compensation if one device charging port 121 is in use, such as when the device 170 is being charged while connected to the device charging port 121 via the connection cable 180. The cable compensator 140 can select a second cable compensation if two device charging ports are in use where the second cable compensation can be higher than the first cable compensation. For example, less cable compensation can be used when one device is connected and being charged and more cable compensation can be used when more than one device is connected and being charged. Depending on desired cable compensation or other desired results, compensation can be matched to the number of devices or can be maximized or minimized based on the number of connected devices being charged. For example, as an alternate to the above description, more cable compensation can be used when one device is connected and being charged and less cable compensation can be used when more than one device is connected and being charged depending on desired results.

According to a possible implementation, the cable compensator 140 can select a first cable compensation value if one device charging port is in use and can select a second cable compensation value if two device charging ports are in use. The cable compensation values can be voltages or other cable compensation values. For example, cable compensation can be applied to compensate for a voltage drop from a cable 180 connected between a device charging port 121 and a device being charged 170. The power supply 110 can adjust a voltage of power supplied to at least one device charging port based on the selected cable compensation. For example, the power supply 110 can be configured to raise an output voltage for cable compensation to compensate for a voltage drop induced by a charging cable coupled to a device charging port. To elaborate, cable compensation can involve raising voltage at the power supply 110 so that by the time the current has reached the device 170 and experienced the cable voltage drop, the voltage can be within minimum and maximum voltages desired or required by the device 170. The cable compensation can also encompass other voltage drop compensation when a voltage drop is caused by a coupling between a power supply and a device. The apparatus 110 can include additional or fewer device charging ports than shown and the cable compensator 140 can select cable compensation based on a variety of different numbers or approximated or assumed numbers of device charging ports in use.

According to a possible embodiment, the device charging port monitor 130 can detect a number of device charging ports in use based on a number of device charging port shields present. For example, the device charging port monitor can detect a number of device charging ports in use based on a number of device charging ports connected to load devices that short their shields to their internal grounds. To elaborate on an example, ground and shield pins can be isolated internal to the apparatus 100 at a device charging port on the power supply side. When an external cable is plugged in, it can short the shield to the ground inside the apparatus 100. A pull up resistor can be used on the shield pin in the apparatus 100, which can provide a high voltage that is monitored to indicate the absence of a shield. When a device cable is plugged in, the shield can get shorted, the high voltage can go away, and the device charging port monitor 130 can determine a load is present on a device charging port in order to detect a number of device charging ports in use.

According to another possible implementation, the device charging port monitor 130 can detect a number of device charging ports in use based on load current on one or more of the device charging ports 121-123. For example, the device charging port monitor 130 can detect a number of device charging ports in use based on load current on each device charging port 121-123. Thus, current monitoring can be used to decide cable compensation. To elaborate on an example, the device charging port monitor 130 can monitor load current through a sense resistor and can process the load current to determine whether a load is present and the cable compensator 140 can select cable compensation accordingly. To further expand, the device charging port monitor 130 can detect a number of devices present based on the overall load current. Thus, when detecting a number of device charging ports in use, the device charging port monitor 130 may not detect the exact number of device charging ports in use and may only assume or approximate the number of charging ports in use based on load current on one or more of the device charging ports 121-123.

According to an example embodiment, the device charging port 121 can be a first device charging port 121 coupled to the power supply 110. The first device charging port 121 can receive power from the power supply 110 and output power to a first device. The device charging port 122 can be a second device charging port 122 coupled to the power supply 110. The second device charging port 122 can receive power from the power supply 110 and output power to a second device. The device charging port monitor 130 can be coupled to the first device charging port 121 and coupled to the second device charging port 122. The device charging port monitor 130 can monitor device charging ports in use. For example, the device charging port monitor 130 can monitor the device charging ports in use based on a number of device charging port shields present. According to another example, the device charging port monitor 130 can monitor the device charging ports in use based on load current on one or more of the device charging ports. According to a further example, connection states of the output ports could also be sensed via a mechanical switch element in a connector shell, such as used in receptacles for SIM cards, memory cards, and audio headphones. The device charging port monitor 130 can also monitor the device charging ports in use based on other methods of monitoring or detecting device charging ports in use. The cable compensator 140 can be coupled to the device charging port monitor 130 and the power supply 110. The cable compensator 140 can adjust cable compensation based on the monitored device charging ports in use. Cable compensation can compensate for a voltage drop from a cable, such as the cable 180, connected between a device charging port, such as the first device charging port 121, and a device being charged, such as the device 170. The power supply 110 can adjust a voltage of power supplied to at least one device charging port based on the adjusted cable compensation.

Operations of the apparatus 100 may be implemented on a general-purpose or a special purpose computer, a programmed processor or microprocessor, peripheral integrated circuit elements, an application-specific integrated circuit or other integrated circuits, hardware/electronic logic circuits, discrete element circuits, programmable logic devices, a programmable logic array, field programmable gate-arrays, or other hardware or software that can implement the disclosed embodiments.

Figure 2:
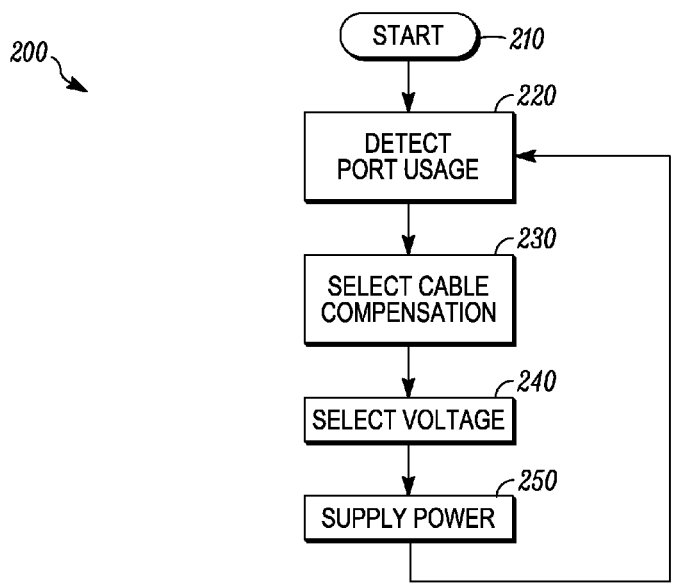
FIG. 2 is an exemplary flowchart illustrating operation of an apparatus in accordance with a possible embodiment.

FIG. 2 is an example flowchart 200 illustrating the operation of the apparatus 100 according to a possible embodiment. In step 210, the flowchart begins. At 220, a number of device charging ports in use can be detected. The detected number of device charging ports in use can be based on a number of device charging port shields present. The detected number of device charging ports in use can also be based on load current on one or more of the device charging ports.

At 230, cable compensation can be selected. For example, a first cable compensation can be selected if one device charging port is in use and a second cable compensation can be selected if two device charging ports are in use. The first cable compensation can be lower than the second cable compensation or can be otherwise selected based on desired cable compensation.

At 240, a voltage of power output from the power supply can be selected. The voltage of power can be based on the selected cable compensation. Selecting the voltage can also include selecting a first voltage of power output from the power supply to a first device charging port. The first voltage of power output from the power supply to the first device charging port can be selected based on a voltage from at least one secondary transformer coil. The first voltage of power output from the power supply to the first device charging port can additionally be selected based on a signal received from a first device communication connection of the first device charging port. Selecting the voltage can include selecting a second voltage of power output from the power supply to a second device charging port. The second selected voltage can be different from the first selected voltage. The second voltage of power output from the power supply to the second device charging port can be selected based on voltage from at least two secondary transformer coils. The second voltage of power output from the power supply to the second device charging port can also be selected based on a signal received from a second device communication connection of the second device charging port.

At 250, power can be supplied from a power supply to a device connected to at least one device charging port based on the selected cable compensation. Supplying power can include raising an output voltage for cable compensation to compensate for a voltage drop induced by a charging cable coupled to a device charging port. The power supplied from the power supply can also be based on the selected voltage or voltages. The flowchart 200 can then loop back to 220 for continuous detection and adjustment. For example, the flowchart 200 can look for the reappearance of no load and can then continue port detection and voltage and cable compensation adjustment. The flowchart 200 can also incorporate other operations disclosed in other embodiments.

Figure 3:
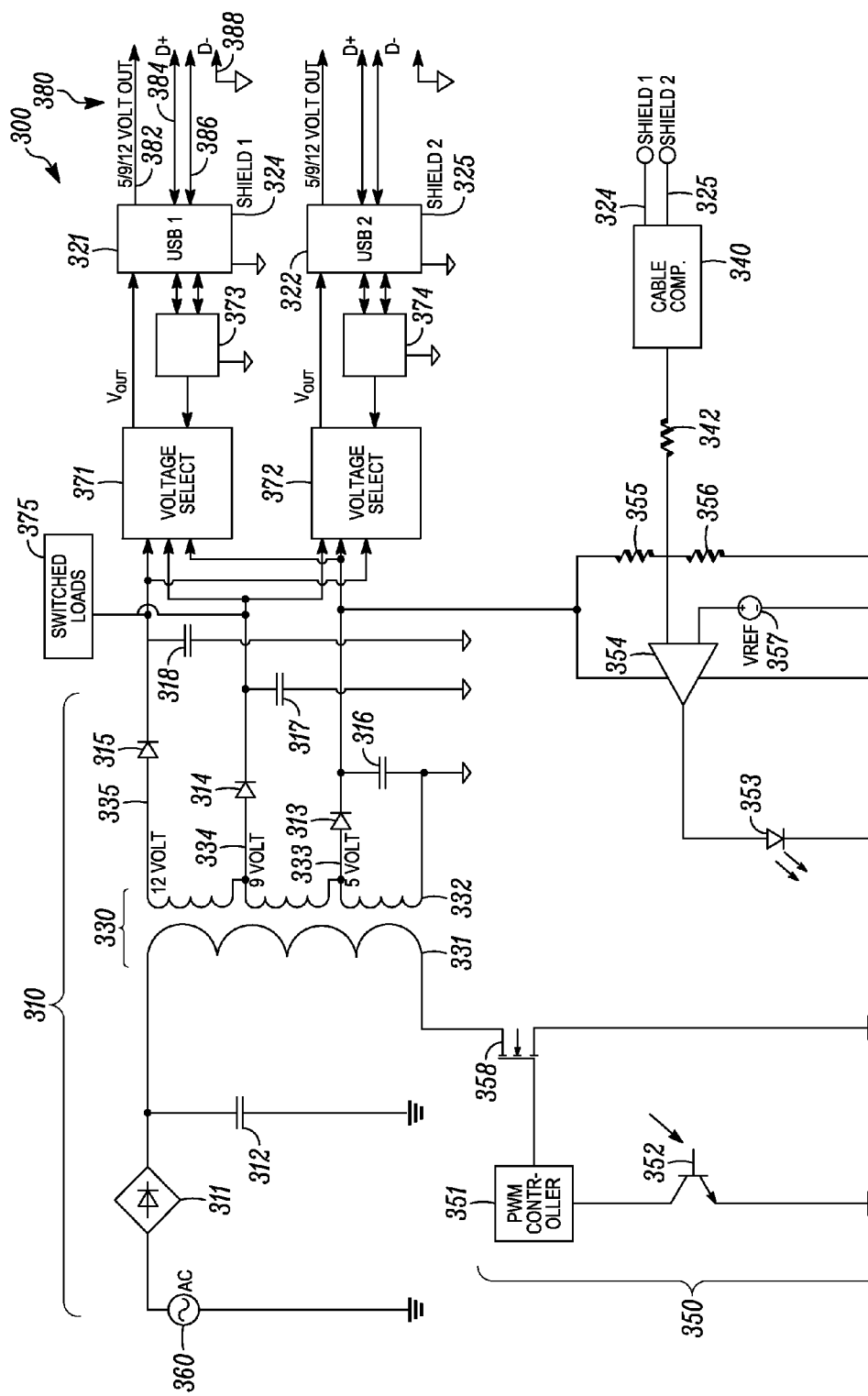
FIG. 3 is an example illustration of an apparatus in accordance with a possible embodiment.

FIG. 3 is an example illustration of an apparatus 300, such as the apparatus 100, in accordance with a possible embodiment. The apparatus 300 can include a power supply 310, such as the power supply 110. The power supply 310 can be connected to a power source 360. The power supply 310 can include power processing elements. For example, the power supply 310 can include a rectification element 311 that can convert alternating current to direct current. The power supply 310 can also include a filtering or smoothing capacitor 312 and a transformer 330. The transformer 330 can be a multiple winding transformer and can include a primary coil 331, such as a primary winding, and a secondary coil 332 that can include multiple secondary coils or windings. The primary coil 331 can receive power input from a power source 360, such as the power source 160. The secondary coil 332 can include multiple windings, can be sequentially wound and tapped, or separately wound and tapped. Power rails 333-335 can output power from windings of the secondary coil 332 through rectification elements 313-315. Rectification elements 313-315 can be passive elements, such as diodes, or can be active elements. The power supply 310 can also include smoothing capacitors 316-318.

The apparatus 300 can include device charging ports 321 and 322, such as the device charging ports 121 and 122, which can be cable connectors. Rails 333, 334, and 335 from secondary coils 332 of the transformer 330 can provide power to the first device charging ports 321 and 322. The device charging ports 321 and 322 can include or can be coupled to shields 324 and 325. Cables, such as a cable 380, which can be the cable 180, can connect devices to the device charging ports 321 and 322. For example, the device charging port 321 can be a USB device charging port that can have connections for the cable 380. The cable 380 can be a USB cable that can include a VBUS line 382, a data + line 384, a data − line 386, and a ground 388. The cable 380 can also include other lines. Furthermore, as discussed above, other ports and cables can also be used.

The apparatus 300 can include a switch matrix, such as voltage selection elements 371 and 372. The voltage selection elements 371 and 372 can select voltages output from the power supply 310 to the device charging ports 321 and 322. The apparatus 300 can include one or more switchable load(s) 375 that can regulate power rails which may be providing low or no power to the device charging ports 321 and 322, such as by controlling discharge of the capacitors 317 and 318. The apparatus 300 can include voltage selection communication elements 373 and 374. The voltage selection communication elements 373 and 374 can receive or exchange voltage selection signals from or with connected devices and can control the switch matrix to select voltage output to the connected devices based on the voltage selection signals or messages exchanged with the connected device(s). For example, the voltage selection communication element 373 can select a first voltage of power output to the first device charging port 321 based on a signal received from a first device communication connection, such as from the data line D+ 384 and the data line D− 386 through a connection of the port 321. The voltage selection communication element 374 can similarly select a second voltage of power output to the second device charging port based on a signal received from the second device communication connection, such as a connection of the port 322.

According to a possible embodiment, the voltage selection elements 371 and 372, the voltage selection communication elements 373 and 374, and/or other elements can be voltage selection circuitry that selects a first voltage of power output to the first device charging port 321 and selects a second voltage of power output to the second device charging port 322, where the second voltage can be different from the first voltage. The voltage selection circuitry can select the first voltage of power output to the first device charging port 321 based on voltage from the at least one secondary coil of the secondary coil 332 and can select the second voltage of power output to the second device charging port based on voltage from the at least two secondary coils of the secondary coil 332. According to a possible implementation, the voltage selection circuitry can select the first voltage of power output to the first device charging port 321 and/or the second device charging port 322 based on tapping at least two secondary coils of the secondary coils 332 for different voltages. According to another possible implementation, the voltage selection circuitry can select the first voltage of power output to the first device charging port 321 and/or the second device charging port 322 by selecting a first coil of the at least two secondary coils for a first coil voltage and selecting a second coil of the at least two secondary coils for a second coil voltage.

The apparatus 300 can include feedback control elements 350. The feedback control elements 350 can include a pulse wave modulation controller 351, coupler elements 352 and 353, the op-amp 354, resistors 355 and 356, a voltage source 357, and a switching element 358. The coupler elements 352 and 353 can provide isolation between primary coil elements and secondary coil elements. For example, the coupler elements 352 and 353, can be opto-electrical devices, such as photo transistors and photo diodes, can be magnetic coupling elements, or can be other elements that provide isolation between primary coil elements and secondary coil elements.

The apparatus 300 can include a cable compensator 340. The cable compensator 340 can include the device charging port monitor 130 and the cable compensator 140. The cable compensator 340 can be coupled to the shields 324 and 325 and can provide cable compensation based on shield detection or based on other cable compensation methods. For example, the cable compensator 340 can compensate for a voltage drop of a cable 380 connected to a device being charged. The voltage drop can be between the secondary coil 332 and an input of a device being charged. The voltage drop can also be between a device charging port, such as the device charging port 321, or between any other element in the apparatus 300, and an input of a device being charged. According to a possible implementation, the cable compensator 340 can be coupled to an op-amp 354. According to other possible implementations, an output of the cable compensator 340 can go through separate circuitry, can be summed with other signals, can go through a coupler element 352, can go into a separate feedback loop with opto-isolation, or can provide an output in any other manner for cable compensation.

According to a possible embodiment of shield detection, the device charging ports 321 and 322 can be USB connectors. In this embodiment, VBUS 382 can be a nominally 5V voltage supply line. D+ 384 can be a positive logic sense data signaling line and D− 386 can be a complementary negative logic sense data signaling line. GND 388 can be a ground return line, such as ~0 volts. At downstream-facing USB source ports 321 and 322, the shield 324 can be connected to ground at the charging port 321 or it can be electrically floating. Cabling, such as the cable 380, that leads from downstream-facing ports of upstream USB devices to relatively upstream-facing downstream ports, such as ports 321 and 322, can have shield conductors insulated from ground conductors, so that the shields 373 and 374 can function as electrical and/or magnetic shields with respect to the conductors they encircle. At the downstream load device the ground and shield can be shorted together. As seen by the downstream-facing USB source port 321, a ground and shield can be insulated from each other when no load device is connected. When a USB load device is connected to the downstream-facing USB source port 321, the port 321 can see the shield as being grounded, because the load device can ground the shield conductor. USB shield detection can be done by leaving a latent pull-up resistor on the shield 373, and a power source, such as the apparatus 300 can monitor it to see if the shield ever goes to ground, which can indicate a load device has been connected to the port 321. The apparatus 300 can continue to monitor that shield line, and if it ever goes back up in voltage, the apparatus 300 can detect that the load device has been disconnected.

According to a possible embodiment, the primary coil 331 of the transformer 330 can be of a single winding, participating in a switchmode power supply, the topology of which may be Forward, Half-Forward, Resonant Forward, Push-Pull, Half-Bridge, Full-Bridge, Ringing Choke Converter, Flyback, or other topology. At least two secondary coils of the secondary coil 332 may be wound and connected in a stacked manner. Alternatively, the at least two secondary coils can be electrically separate. Cross-regulation between the outputs of the transformer 330 can be improved when the conductors of the at least two secondary coils are wound in a multifilar manner, with conductors disposed side-by-side-by-side with one another as they helically encircle the transformer's winding bobbin, as opposed to secondary coils being fashioned as discrete concentric or discrete adjacent windings. Although more expensive, this multifilar winding technique can minimize leakage inductances, which would otherwise detract from cross-regulation performance.

For most applications, negative terminals of the at least two secondary coils can be connected to form a common output ground, which can be a shared reference point for return conductors of the at least two output ports 321 and 322. An auxiliary coil can be included in the transformer 330 to provide power for a switchmode controller, and to provide current sense feedback as well as output voltage feedback.

According to another possible embodiment, different rectification elements may be used with the secondary coil 332, and their type may be chosen in order to optimize the design for economy, efficiency, and/or area size. For example, basic P-N junction diodes can be economical, but may incur higher losses. Schottky diodes can also be used, as their cost can be similar to P-N junction diodes, and their lower forward voltage can decrease losses to the system efficiency into normally acceptable ranges. Any of the rectification elements can also include multiple, such as two, parallel-connected diodes. In higher power applications, rectification elements can also be synchronously driven MOSFET's, which can have their body diodes oriented from the secondary coils 332 toward the output ports 321 and 322. This option can offer the higher efficiency and lower temperature rise, but can incur additional cost and circuit space, and can use yet another secondary winding on the transformer 330 so the gates of the MOSFETs can be self-timed. Other active semiconductor devices may be used in place of MOSFET's, such as thyristors, silicon controlled rectifiers, solid-state relays, Isolated-Gate Bipolar Transistors (IGBT), or other types of semiconductor switch devices.

Capacitors 316-318, such as shunt-connected bulk capacitors, immediately downstream from the rectification elements 313-315, can serve as charge reservoirs that can smooth at least two voltages from the coil 332, which may be selected by the switching elements 371 and 372 for delivery to the output ports 321 and 322. The apparatus 310 can be a Switch Mode Power Supply (SMPS). During each switching cycle of the SMPS 310, current from the secondary coils 332 can be delivered into the capacitors 316-318 and to the output ports 371 and 372 during the first part of the switching cycle, while during the second part of each SMPS switching cycle, the capacitors 316-318 can themselves supply current to the output ports 371 and 372.

According to another possible embodiment, in the multi-output SMPS 310, whichever output voltage has the most required accuracy can be the output voltage that is used for feedback and control of the overall system 300. The other output voltage(s) may be less well-regulated, and the degree to which one or more output voltage vary from their nominal target voltages under varying load conditions of the output voltages can be termed cross-regulation. When all output voltages have minimum load currents that are not close to zero, such as less than 100 mA, design practices can be employed so the unregulated output voltages stay within required specification limits. When one or more unregulated output has low or no load, its voltage can increase above specified limits, potentially into ranges intolerable by other components connected to this or these electrical node(s). Thus, clamping or bleeding can be used. For example, a shunt-connected Zener diode can prevent excessive rise of the unregulated outputs at low or no load. This shunt connected Zener diode can be connected from a voltage output to output-ground, where all the excess clamped energy can be dissipated as heat, or it can be connected from an unregulated voltage output to a regulated voltage output, if the regulated voltage output is operated at a lower voltage than the unregulated voltage output using the clamping effect. This may be implemented using a more accurate linearly regulated bleed-off circuit. It may also be implemented using a switchmode version of a bleed-off circuit. The active bleed-off circuit used with stacked secondary coils can be applied to multiple secondary coils having a common ground.

According to another possible embodiment, each output port 321 and 322 can be fed by a voltage select element 371 and 372, such as a voltage select circuit. Each voltage select element 371 and 372 can be on/off switch devices, in number equal to the number of output voltages which may be selected for delivering power to the output ports 321 and 322. For example, each of the two output ports 321 and 322 can be fed power from the voltage select elements 371 and 372, respectively. Each of the voltage select elements 371 and 372 can include three on/off solid-state switch devices. For example, one solid state switch device can be coupled from the 12 Volt rail 335 to Vout, another can be coupled from the 9 Volt rail 334 to Vout, and a third can be coupled from the 5 Volt rail 333 to Vout. These solid-state on/off switch devices may be bipolar junction transistors, thyristors, silicon controlled rectifiers, solid-state relays, IGBTs, MOSFETs, or other types of semiconductor switch devices. In the case of switch devices that have a body diode or similar conductive path, the device connections can have the body diode pointing from an output port 321 toward the secondary coils 332. Within a given voltage select element 371 or 372, one of the switch devices may be active and conducting at a given time and may not be active for during make/break transitions.

The conduction states of solid-state switches within a given voltage select element 371 or 372 can be controlled by secondary controller circuits, such as the voltage selection communication elements 373 and 374, which can include elements for negotiating output voltage capability and requests between an output port, such as port 321, and a connected load device. The voltage selection communication elements 373 and 374 can also include elements to control conduction states of solid-state switches of the voltage select elements 371 and 372 based on a voltage agreed-upon by the connected load device and the voltage selection communication elements 373 and 374. According to a possible implementation, a voltage selection communication element can be a USB bus regulator and charger management circuit, a Qualcomm HVDCP-compliant chip, or any other element that can negotiate the voltage to be delivered. Each output port 321 and 322 can independently negotiate the voltage to be delivered to its connected load device, and can independently control its voltage select element 371 or 372 accordingly. Unless otherwise negotiated, the output ports 321 and 322 can default to a nominal output voltage to accommodate unknown load device voltage requirements and to start device negotiation at a known operating voltage. In further advanced embodiments, the function of rectification elements can be absorbed by the voltage select elements 373 and 374, if the active solid-state switch device in each voltage select block 371 and 372 is pulsed in synchronism with a collapsing flux field in the transformer 330, and if the bulk smoothing capacitors 316-318 are moved downstream of the voltage select elements 371 and 372.

Some embodiments can provide for a high power, low cost, small size, multiple port universal power supply that provides fast charging for connected devices. Some embodiments can provide 5V and other voltage cable compensation for multiple ports. Some embodiments can accommodate power management integrated circuits that have higher minimum voltage inputs, such as 4.4V min at a device connector, that provide for high current charging. Some embodiments can further accommodate for high battery capacity and increased smartphone usage with power-hungry applications. Some embodiments can also provide faster and higher power charging with reduced device charging time. Some embodiments can additionally provide for multiple port charging.

Some embodiments can further provide multi-voltage independent ports that share secondary power to minimize cost and size of a device charger. For example, VBUS lines can be connected together on two ports when set to the same voltage and current can be shared when ports use different output voltages. Each port voltage output can be independently controlled using separate communication signals for voltage levels.

A two or more step cable compensation scheme can maximize a charging rate based on a number of devices connected. For example, if only one USB device is detected, cable compensation can be maximized, such as when charging at 5V or other voltages. Cable compensation can also be adapted, such as reduced, if two or more devices are connected to charging ports to keep VBUS within USB specifications and to safely charge a lightly loaded second device. Some embodiments can provide a dual USB-A port, or other charging port, multiple voltage power supply to provide higher power and faster charging at lower cost. Some embodiments can further provide a lower cost and size charging device than one that uses two independent USB-A ports that only share a front end. Some embodiments can use a common front end power supply that can be shared by multiple charging ports and that can use a power level that can be lower in power than possible load combinations. Some embodiments can use switched loads that can be used for alternate cable compensation, such that a power supply can provide differing compensations for each port, simultaneously.

Some embodiments can provide a tapped or multi-coil secondary transformer design with 5V regulated and 9V/12V cross regulated charging voltages. Voltage levels can be switched to a VBUS voltage level as required. According to some implementations, charging port voltages can start at 5V and can be under independent control for voltage setting based on connected device communication signals. The charging ports can have VBUS lines connected together if set at the same voltage setting. Voltage switching can be done in a manner to protect attached devices and ensure proper transition times to new voltages while dissipating transients, such as when switching from lower to higher voltages, such as 5V to 9V, and when switching from higher to lower voltage, such as 9V to 5V. Power can be shared between USB ports based on current draw of attached devices. Cable compensation can be optimized for one device, such as based on 0.2V/A compensation, or for two devices where less compensation can be given to a second connected device when it has a light load, which can result in a higher voltage at a first connected device. A shunt load can be activated on outputs other than 5V if the voltage exceeds desired level to improve regulation. Various device standards can be incorporated into embodiments, such as to project compatible D+/D−protocol to attached devices for maximum current draw.

Some embodiments can choose one cable compensation value for a single load and choose different cable compensation values for different loads. This is because if a single cable compensation value is chosen based on one load, it may not be enough for additional loads. Furthermore, if single cable compensation value is for multiple loads, it may be too much for reduced loads. Thus, different cable compensation values can be chosen for different loads. One way to know how many loads are present is to monitor a number of shields present, because the shields can be in the circuit whenever their respective load is present. Another way to know how many loads are present is to monitor current. For example, instead of shield detection being used for load information, each load current through a device charging port can be monitored through a sense resistor. The monitored load current can be processed through anything from a set of operational amplifiers to a microprocessor. For example, as device charging port usage increases, voltage tolerances can tighten, and other parameters can change, and a microprocessor can be used for increased processing requirements. Additional methods can be used to determine the number of loads present, such as by using data signals received from connected devices. According to a possible implementation, a power supply can regulate output voltage to the last node possible of an interior circuit, such as just before a voltage select block, or to another node of a circuit. Some embodiments can monitor at least one output parameter. An algorithm of software or hardware, electrical or mechanical, can adjust the operation of an input parameter based on the monitored output parameter so that the downstream output parameter stays within at least one desired specification over varying operating conditions.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean at least one of, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. An apparatus comprising:
   a power supply;
   a first device charging port coupled to the power supply, the first device charging port configured to receive power from the power supply and output power to a first device;
   a second device charging port coupled to the power supply, the second device charging port configured to receive power from the power supply and output power to a second device;
   a device charging port monitor coupled to the first device charging port and coupled to the second device charging port, the device charging port monitor configured to detect a number of device charging ports in use; and
   a cable compensator coupled to the device charging port monitor, the cable compensator configured to select a first cable compensation if one device charging port is in use and configured to select a second cable compensation if two device charging ports are in use, where the first cable compensation is a first voltage value that is different from the second cable compensation which is a second voltage value.

2. The apparatus according to claim 1, wherein the power supply adjusts a voltage of power supplied to at least one device charging port based on the selected cable compensation.

3. The apparatus according to claim 1, wherein the first voltage value is lower than the second voltage value.

4. The apparatus according to claim 1, wherein the cable compensation is configured to raise an output voltage to compensate for a voltage drop induced by a charging cable coupled to a device charging port.

5. The apparatus according to claim 1, wherein the device charging port monitor detects a number of device charging ports in use based on a number of device charging port shield pins present.

6. The apparatus according to claim 1, wherein the device charging port monitor detects a number of device charging ports in use based on load current on one or more of the device charging ports.

7. The apparatus according to claim 1, further comprising voltage selection circuitry that selects a first voltage of power output to the first device charging port and selects a second voltage of power output to the second device charging port, where the second voltage is different from the first voltage.

8. The apparatus according to claim 7, further comprising a transformer including a primary coil coupled to the power supply and at least two secondary coils coupled to the first device charging port and the second device charging port, wherein the voltage selection circuitry selects the first voltage of power output to the first device charging port based on voltage from the at least one secondary coil and selects the second voltage of power output to the second device charging port based on voltage from the at least two secondary coils.

9. The apparatus according to claim 7, wherein the first device charging port includes a first device communication connection, wherein the second device charging port includes a second device communication connection, and wherein the voltage selection circuitry selects a first voltage of power output to the first device charging port based on a signal received from the first device communication connection and selects a second voltage of power output to the second device charging port based on a signal received from the second device communication connection.

10. A method comprising:
   detecting a number of device charging ports in use;
   selecting a first cable compensation if only one device charging port is in use, the first cable compensation being a first voltage value;
   selecting a second cable compensation if two or more device charging ports are in use, the second cable compensation being a second voltage value; and
   supplying power from a power supply to a device connected to at least one device charging port based on the selected cable compensation,
   wherein the first voltage value is lower than the second voltage value.

11. The method according to claim 10, wherein supplying power comprises raising an output voltage for cable compensation to compensate for a voltage drop induced by a charging cable coupled to a device charging port.

12. The method according to claim 10, wherein the detected number of device charging ports in use is based on a number of device charging port shield pins present.

13. The method according to claim 10, wherein the detected number of device charging ports in use is based on load current on one or more of the device charging ports.

14. The method according to claim 10, further comprising:
   selecting a first voltage of power output from the power supply to a first device charging port; and
   selecting a second voltage of power output from the power supply to a second device charging port, where the second voltage of power output is different from the first voltage of power output.

15. The method according to claim 14, wherein selecting the first voltage comprises selecting the first voltage of power output from the power supply to the first device charging port based on voltage from at least one secondary transformer coil, and wherein selecting the second voltage comprises selecting the second voltage of power output from the power supply to the second device charging port based on voltage from at least two secondary transformer coils.

16. The method according to claim 14, wherein selecting the first voltage of power output comprises selecting the first voltage of power output from the power supply to the first device charging port based on a signal received from a first device communication connection of the first device charging port, and wherein selecting the second voltage of power output comprises selecting a second voltage of power output from the power supply to the second device charging port based on a signal received from a second device communication connection of the second device charging port.

17. An apparatus comprising:
   a power supply;
   a first device charging port coupled to the power supply, the first device charging port configured to receive power from the power supply and output power to a first device;
   a second device charging port coupled to the power supply, the second device charging port configured to receive power from the power supply and output power to a second device;
   a device charging port monitor coupled to the first device charging port and coupled to the second device charging port, the device charging port monitor configured to monitor device charging ports in use; and
   a cable compensator coupled to the device charging port monitor and coupled to the power supply, the cable compensator configured to adjust cable compensation based on the monitored device charging ports in use, where cable compensation is a voltage value that compensates for a voltage drop from a cable connected between a device charging port and a device being charged, wherein the power supply adjusts a voltage of power supplied to at least one device charging port based on the adjusted cable compensation.

18. The apparatus according to claim 17, wherein the device charging port monitor monitors the device charging ports in use based on a number of device charging port shield pins present.

19. The apparatus according to claim 17, wherein the device charging port monitor monitors the device charging ports in use based on load current on one or more of the device charging ports.

* * * * *

UNITED STATES PATENT AND TRADEMARK OFFICE
CERTIFICATE OF CORRECTION

PATENT NO. : 9,584,041 B2  
APPLICATION NO. : 14/101377  
DATED : February 28, 2017  
INVENTOR(S) : Rokusek et al.

Page 1 of 1

It is certified that error appears in the above-identified patent and that said Letters Patent is hereby corrected as shown below:

On the Title Page

Column 2, Item (56), under "OTHER PUBLICATIONS", Line 1, delete "and English" and insert -- and copy of English --, therefor.

Signed and Sealed this  
Nineteenth Day of September, 2017

Joseph Matal  
*Performing the Functions and Duties of the*  
*Under Secretary of Commerce for Intellectual Property and*  
*Director of the United States Patent and Trademark Office*